US012115451B2

(12) United States Patent
Zhang et al.

(10) Patent No.: US 12,115,451 B2
(45) Date of Patent: Oct. 15, 2024

(54) TARGETING OF A LONG-RANGE OBJECT IN A MULTIPLAYER GAME

(71) Applicant: Riot Games, Inc., Los Angeles, CA (US)

(72) Inventors: Michael Longqiang Zhang, Playa Vista, CA (US); Alexander Nixon Huang, Los Angeles, CA (US); Kam-Wing Fung, Los Angeles, CA (US)

(73) Assignee: Riot Games, Inc., Los Angeles, CA (US)

( * ) Notice: Subject to any disclaimer, the term of this patent is extended or adjusted under 35 U.S.C. 154(b) by 14 days.

(21) Appl. No.: 17/893,526

(22) Filed: Aug. 23, 2022

(65) Prior Publication Data

US 2022/0395751 A1 Dec. 15, 2022

Related U.S. Application Data

(63) Continuation of application No. 17/018,282, filed on Sep. 11, 2020, now Pat. No. 11,458,394.

(51) Int. Cl.
*A63F 13/5378* (2014.01)
*A63F 13/2145* (2014.01)
*A63F 13/53* (2014.01)
*A63F 13/537* (2014.01)

(52) U.S. Cl.
CPC ........ *A63F 13/537* (2014.09); *A63F 13/2145* (2014.09); *A63F 13/53* (2014.09); *A63F 13/5378* (2014.09)

(58) Field of Classification Search
None
See application file for complete search history.

(56) References Cited

U.S. PATENT DOCUMENTS

| 2015/0258442 A1 | 9/2015 | Yudo et al. |
| 2018/0043260 A1 | 2/2018 | Tang et al. |

(Continued)

FOREIGN PATENT DOCUMENTS

| CN | 109568957 A | 4/2019 |
| CN | 109675310 A | 4/2019 |

(Continued)

OTHER PUBLICATIONS

International Preliminary Report on Patentability received for PCT Patent Application No. PCT/US2021/049565, dated Mar. 23, 2023, 11 pages.

(Continued)

*Primary Examiner* — Damon J Pierce
(74) *Attorney, Agent, or Firm* — Shook, Hardy & Bacon L.L.P.

(57) ABSTRACT

A system and method for improved targeting of a long-range object in a multiplayer online battle arena (MOBA) game is provided. Initially, a touch gesture is received at a tool selection area of a dynamic image provided by the MOBA game, enabling a user to select a tool (e.g., an ability, a virtual weapon, a spell, or the like) to target an object within the virtual world. Next, a second touch gesture is received at a mini-map of the virtual world causing the dynamic image to be automatically adjusted from a perspective corresponding to a character controlled by the user to a perspective representing the location selected within the mini-map. Finally, a third touch gesture is received at a targeting tool providing a target range of the selected tool within the adjusted dynamic image and the user can more precisely and accurately target the object.

20 Claims, 9 Drawing Sheets

(56) References Cited

U.S. PATENT DOCUMENTS

| | | | |
|---|---|---|---|
| 2018/0089942 A1 | 3/2018 | Filipour et al. | |
| 2018/0292952 A1 | 10/2018 | Norman et al. | |
| 2019/0060745 A1 | 2/2019 | He | |
| 2019/0070494 A1 | 3/2019 | He | |
| 2019/0076739 A1 | 3/2019 | Ge | |
| 2019/0232167 A1 | 8/2019 | Hall | |
| 2019/0255437 A1* | 8/2019 | Wang | A63F 13/5378 |
| 2020/0316470 A1 | 10/2020 | Yang | |
| 2021/0322864 A1 | 10/2021 | Shao et al. | |
| 2021/0402298 A1 | 12/2021 | Zhou et al. | |

FOREIGN PATENT DOCUMENTS

| | | |
|---|---|---|
| CN | 110548286 A | 12/2019 |
| CN | 110559647 A | 12/2019 |
| WO | 2008/052255 A1 | 5/2008 |
| WO | 2020/108630 A1 | 6/2020 |

OTHER PUBLICATIONS

Notice of Allowance received for Korean Patent Application No. 2023-7012208, dated May 8, 2023, 5 pages. (English Translation Submitted).

International Search Report and Written Opinion received for PCT Patent Application No. PCT/US2021/049565, dated Jan. 24, 2022, 13 pages.

Wikipedia, "PlayerUnknown's Battlegrounds", https://en.wikipedia.org/w/index.php?title=PlayerUnknown%27s_Battlegrounds&oldid=976792823, Sep. 5, 2020 (Year: 2020).

PUBG Mobile, YouTube, "Map Control tips for Miramar! Pubg Mobile", May 20, 2018 (Year: 2018).

David Jagneaux, "PU BG Mobile Review", IGN, https://www.ign.com/articles/2018/03/24/pubg-mobile-review, Mar. 26, 2018 (Year: 2018).

"Shift Queueing via Minimap" by Aoret SC2, YouTube video, https://www.youtube.com/watch?v=EuFHy1INOqc, Nov. 19, 2017 (Year: 2017).

Supplementary European Search Report and Search Opinion received for European Application No. 21867558.5, mailed on Dec. 18, 2023, 8 pages.

Notice of Allowance received for Chinese Patent Application No. 202180062690.1, mailed on Apr. 5, 2024, 4 pages (2 pages of English Translation and 2 page of Original Document).

\* cited by examiner

TARGETING OF A LONG-RANGE OBJECT IN A MULTIPLAYER GAME

CROSS-REFERENCE TO RELATED APPLICATIONS

This application is a continuation of and claims priority from U.S. application Ser. No. 17/018,282, filed Sep. 11, 2020, titled "TARGETING OF A LONG-RANGE OBJECT IN A MULTIPLAYER GAME," which is assigned or under obligation of assignment to the same entity as this application, the entire contents of the application being herein incorporated by reference.

BACKGROUND

Video games provide entertainment, competition, and intellectual stimulation for players. In a vast majority of multiplayer online battle arena (MOBA) games or other multiplayer strategy video games, communicating information to a player that is relevant to the player's situation is critical to player enjoyment. As such the development, implementation, and functionality of graphical elements in a game's user interface (UI) are important. For example, MOBA games or other multiplayer strategy video games oftentimes involve vast virtual worlds or virtual maps in an isometric perspective view. For navigation, communication, and other in-game actions (e.g., targeting) and communication within these virtual worlds, maps are often selectable for display within the game.

However, targeting in MOBA games presents challenges as these games often introduce new tools (e.g., abilities, virtual weapons, spells, and the like) that can be used to target long-range targets. In these games, conventional UIs introduce precision issues for a user targeting long-range targets. For example, in a typical case, a user is looking at a player object corresponding to the user and when the user aims a virtual joystick, a circle of range for a selected ability is provided from the perspective of the player object. In this way, when the user aims the virtual joystick up, the ability is aimed to a position that is relatively up from the player object.

While this works well for tools that have a circle of range roughly equal to the screen size, it falls short when the circle of range exceeds the screen size. This may be the case when a target is far away from the player object or the tool has a much larger range. In this scenario, a particular tool may have a linear direction (e.g., shooting an arrow or laser beam across the map). Given the size of the virtual joystick and the precision that the virtual joystick has available, when the user attempts to aim at targets that are far away, a small, pixel-level of movement on the virtual joystick results in massive shifts within the game space. Moreover, the user may not even be able to see the target within the display. These UI deficiencies result in an overall lack of precision and an inability to effectively utilize the new tools having increased range.

SUMMARY

Embodiments of the present disclosure relate to providing improved targeting of a long-range object. More particularly, embodiments relate to systems and methods to accurately and precisely target a player object in a MOBA game that is outside the current view of the virtual world displayed to the user (i.e., not within the dynamic image). In essence, the described embodiments facilitate the ability to automatically adjust the perspective of the virtual world from a player object corresponding to the user to a location selected on a mini-map. Moreover, the adjusted dynamic image corresponds to a size of the target range of a selected tool, enabling the user to target the player object within the view provided by the adjusted dynamic image.

In some example embodiments, the improved targeting of a long-range object is accomplished via an offset camera engine tool that automatically adjusts the perspective provided of the virtual world in real-time while a user is targeting another player object. For instance, a method herein can include the steps of displaying a dynamic image depicting objects of a multi-player game on a touchscreen. The dynamic image is a portion of the virtual world. A first touch gesture may be received at a tool selection area of the dynamic image that enables a user to select a tool to target a target object. The method can then include receiving a second touch gesture at a mini-map that provides a plan view of at least a portion of the virtual world. The mini-map often provides a full view of the dynamic world and, as such, provides a view of a larger portion of the virtual world than the dynamic image. In response to receiving the second touch gesture, the dynamic image is automatically adjusted to a perspective representing a selected location of the virtual world corresponding to the received second touch gesture. Finally, the method can include receiving a third touch gesture at a targeting tool of the dynamic image. The targeting tool depicts a target range of the selected tool within the adjusted dynamic image.

In some embodiments, upon execution of the third touch gesture at the targeting tool of the dynamic image, the selected tool is utilized on the target object. Once the selected tool has been utilized on the target object, the dynamic image may automatically adjust back to the perspective of the player object corresponding to the user. In some embodiments, the dynamic image may not automatically adjust back to the perspective of the player object corresponding to the user until the target object has been eliminated or destroyed.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are described in detail below with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

The online multiplayer video gaming industry has gained immense popularity across all demographics around the globe. As online multiplayer video games move to mobile platforms for play on touchscreen devices, such as tablets and smart phones, some modifications are required for both how the game is displayed and how users interface with it (e.g., control the game). For instance, size constraints of touchscreens present various challenges, such targeting long-range targets. However, limited screen size and processing capabilities of such touchscreen devices have presented challenges in providing a full-featured multiplayer video game via a mobile platform.

Conventional UIs provide a display from the perspective of the player object of the user. This perspective introduces precision issues for a user targeting long-range targets that are off-screen (i.e., not provided in the current display). Typically, the display provides a circle of range for a selected tool (e.g., an ability, a virtual weapon, a spell, or the like). Although this works well for tools that have a circle of range roughly equal to the screen size, it falls short when the circle of range exceeds the screen size. This is problematic when the target is far away from the player object or the tool has a much larger range than the screen size. Even small, pixel-level of movements on the virtual joystick result in massive shifts within the game space. Since the user may not even be able to see the target within the display, these UI deficiencies result in an overall lack of precision and an inability to effectively utilize the new tools having increased range.

As such, various embodiments of the present disclosure are directed to a system and computer-implemented method for providing improved targeting of a long-range object. The system and computer-implemented method can be employed to accurately and precisely target a player object in a MOBA game that is outside the current view of the dynamic image displayed to the user. This improved targeting is accomplished by initially receiving a touch gesture at a tool selection area of the dynamic image. For clarity, the tool selection are enables a user to select a tool (e.g., an ability, a virtual weapon, a spell, or the like) to target an object within the virtual world. Although touch gesture is used throughout the present disclosure, it is contemplated that any user interaction, such as from use of a mouse, a traditional joystick, a keyboard, a voice command, or other method, is contemplated and within the scope of the claims.

Next, a second touch gesture is received at a mini-map of the virtual world. In response to receiving the second touch gesture, the dynamic image is automatically adjusted to a perspective representing the location selected within the mini-map. Once the perspective changes from the point of view of a character controlled by the user to the location specified by the second touch gesture, a third touch gesture can be received at a targeting tool providing a target range of the selected tool within the adjusted dynamic image. This enables the user to more precisely and accurately target the object. In other words, the perspective of the dynamic image snaps to the location selected within the mini-map and the adjusted dynamic image corresponds to a size of the target range of the selected tool. Accordingly, the user is able to target the target object within the display provided by the adjusted dynamic image. In some embodiments, the third touch gesture may enable the user to rotate the perspective 360 degrees around the selected location of the mini-map.

Figure 1:
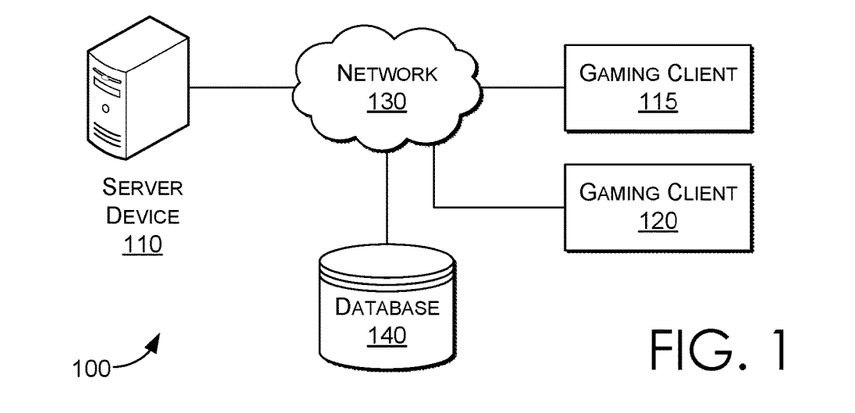
FIG. 1 depicts an exemplary operating environment in accordance with some embodiments of the present disclosure.

Turning now to FIG. 1, a schematic depiction is provided illustrating one exemplary operating environment 100 of which an embodiment of the present disclosure can be employed. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The operating environment 100 of FIG. 1 includes a server device 110 that provides a service to one or more client devices, such as gaming clients 115,120, for instructing game play and/or settings in a virtual gaming environment over a network 130, such as the Internet. The gaming clients 115,120 may be implemented on one or more processors as later described herein. In some embodiments, the gaming clients 115,120 are mobile electronic devices having touchscreens thereon, such as smart phones, tablets, or laptop computers. The server device 110 and the gaming clients 115,120 may communicate in a wired or wireless manner over the network 130.

In some embodiments, the server device 110 is coupled, directly or indirectly, to a database 140 for facilitating the storage and querying of records corresponding to a plurality of game play instructions, actions, objects (e.g., virtual game pieces/characters, weapons, buildings, etc.), maps, and/or settings. The database 140 includes, among other things, a relational database or similar storage structure accessible by the server device 110. In accordance with embodiments described herein, the database 140 stores a plurality of records that each corresponds to game play instructions, actions, objects, maps, and/or settings.

The server device 110 includes a gaming server accessible by any of the gaming clients 115,120 and/or a data server for supporting an application of any of the gaming clients 115,120, over the network 130. The gaming server can support any type of application, including those that facilitate live game play. The server device 110 can further determine relationships (e.g., teams) between the gaming clients 115,120. In various embodiments, the server device 110 communicates actions commanded via one or more of the gaming clients 115,120, to another one or more of the gaming clients 115,120 for presentation thereon via user interfaces or the like, as later described herein.

Network 130 may be wired, wireless, or both. Network 130 may include multiple networks, or a network of networks, but is shown in simple form so as not to obscure aspects of the present disclosure. By way of example, network 130 can include one or more wide area networks (WANs), one or more local area networks (LANs), one or more public networks, such as the Internet, one or more private networks, and/or one or more telecommunications networks. Where network 130 includes a wireless telecommunications network, components such as a base station, a communications tower, or even access points (as well as other components) may provide wireless connectivity. Networking environments are commonplace in enterprise-wide computer networks, intranets, and the Internet. Accordingly, network 130 is not described in significant detail.

In accordance with embodiments of the present disclosure, the server device 110 or the gaming clients 115, 120 can each be a computing device that is capable of accessing the Internet, such as the World Wide Web, and/or a telecommunications network. Either one of the server device 110 or the gaming clients 115, 120 might take on a variety of forms, such as a personal computer (PC), a laptop computer, a mobile phone, a tablet computer, a wearable computer, a personal digital assistant (PDA), an MP3 player, a global positioning system (GPS) device, a video player, a handheld communications device, a smartphone, a smart watch, a workstation, any combination of these delineated devices, or any other suitable device.

It should be understood that any number of the aforementioned devices may be employed in operating environment 100 within the scope of the present disclosure. Each may comprise a single device or multiple devices cooperating in a distributed environment. Additionally, other components not shown may also be included within the distributed environment. It should further be understood that operating environment 100 shown in FIG. 1 is an example of one suitable computing system architecture. Each of the servers, gaming clients, networks, and databases shown in FIG. 1 may be implemented via a computing device, such as computing device 1000, later described with reference for FIG. 10, for example. The components may communicate with each other via network 130.

Figure 2:
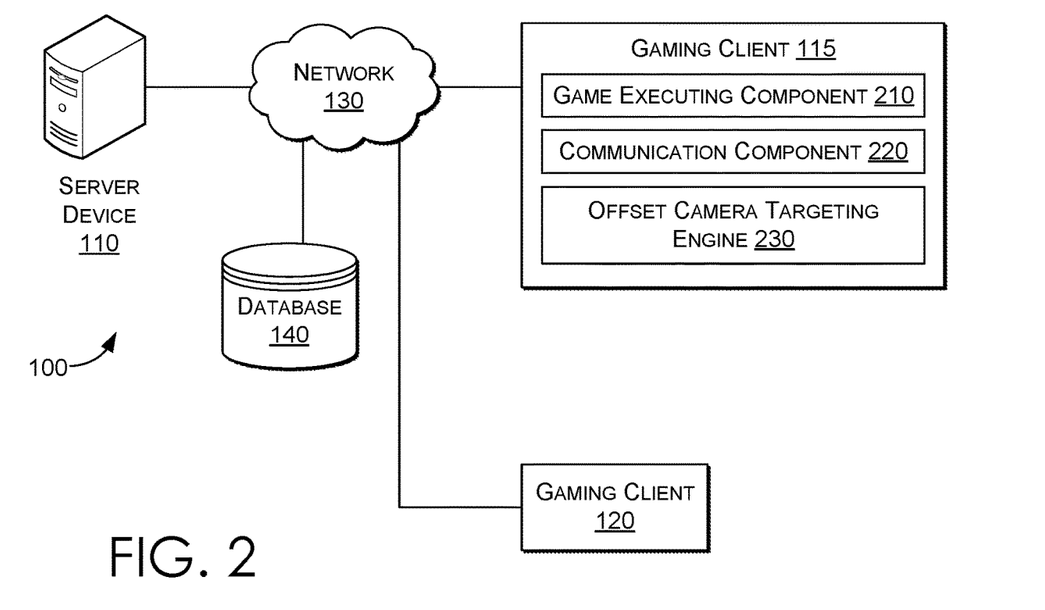
FIG. 2 is a block diagram illustrating an exemplary implementation of a system for providing offset camera targeting in accordance with some embodiments of the present disclosure.

Next, FIG. 2 depicts a block diagram of operational modules of an exemplary one of the gaming clients, specifically gaming client 115, in accordance with some embodiments of the present disclosure. It is noted that the depicted implementation is merely exemplary, and not intended to be limiting in any way, as each component can be arranged in various configurations, spread across a number of computing devices, combined with other components or one another, arranged to communicate over a network, or any combination of the foregoing including others not mentioned. For example, each of the operational modules may comprise a combination of hardware components and/or computer instructions stored on computer-readable media and executable on a processor thereof, as later described in regards to computing device 1000 below.

As depicted in FIG. 2, the operational modules of the gaming client 115 may comprise a game executing component 210, a communication component 220, and offset camera targeting engine 230. The game executing component 210 can be configured for executing a game associated therewith, such as MOBA games described herein. In some embodiments, executing the game may include displaying a dynamic image, such as the dynamic image 400, 500, 600, 700, 800 later described herein and depicted in FIGS. 4-8. The communication component 220 can be configured for network communications between the gaming client 115, the gaming client 120, and/or the server device 110 via network 130. Generally, the offset camera targeting engine 230 can be configured for dynamically altering the perspective of the dynamic image. In particular, the offset camera targeting engine 230 dynamically alters the perspective from the player object corresponding to the user to a center point that matches the maximum range of a joystick corresponding to a particular ability at the location the user has selected from a mini-map. For clarity, a mini-map typically enables a player to quickly view, at a high level, multiple locations in the game's world while maintaining a view centered on the player object corresponding to the user.

Figure 3:
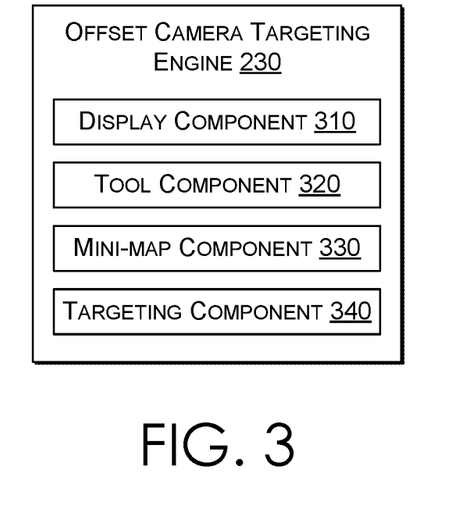
FIG. 3 is a block diagram illustrating an exemplary implementation of an offset camera targeting engine in accordance with some embodiments of the present disclosure.

As shown in FIG. 3, the offset camera targeting engine 230 includes several components. For example, the offset camera targeting engine 230 may include a display component 310, a tool component 320, a mini-map component 330, and a targeting component 340. Initially, the display component 310 displays a dynamic image depicting objects of a multiplayer game on a touchscreen. The objects of the multi-player game comprise player objects and nonplayer objects. In a non-targeting scenario, the dynamic image depicts the objects from the perspective of a player object corresponding to the user.

The tool component 320 receives a first touch gesture at a tool selection of the dynamic image. The tool selection area enables a user to set a tool to utilize on a target object of the objects within the virtual world. As described herein, the tool may be an ability, a virtual weapon, a spell, or the like. Next, the mini-map component 330 receives a second touch gesture at a mini-map. The mini-map provides a plan view of at least a portion of the virtual world and may provide a view of targets (i.e., other player objects) outside the view of the dynamic image. In response to the mini-map component 330 receiving the second touch gesture, the display component 310 automatically adjusts the dynamic image to a perspective representing a selected location of the virtual world corresponding to the received second touch gesture. In this way, the dynamic image is automatically changed from the perspective of the player object corresponding to the user to a perspective of the selected location.

Finally, targeting component 340 receives a third touch gesture at a targeting tool of the dynamic image. The targeting tool depicts a target range of the selected tool within the adjusted dynamic image. This allows the user to make more precise targeting movements to target the target object within the adjusted dynamic image than is possible within the dynamic image, in part because the target object may actually be visible within the adjusted dynamic image, and in part because the adjusted dynamic image may be adjusted in size based on the radius of the target range. As can be appreciated, this allows eliminates the problems of conventional UIs where small targeting movements result in large movements within the dynamic image. Consequently, the user is able to more precisely and accurately target the target object.

In some embodiments, upon execution of the third touch gesture at the targeting tool of the dynamic image, targeting component 340 causes the selected tool to be utilized on the target object. In some embodiments, upon the selected tool being utilized on the target object, the display component 310 automatically adjusts the adjusted dynamic image back to the perspective of a player object corresponding to the user (i.e., the dynamic image). Alternatively, the display component 310 may not automatically adjusted the adjusted dynamic image back to the perspective of the player object corresponding to the user until the target object has been eliminated or destroyed. In some embodiments, the display component 310 may automatically adjusted the adjusted dynamic image back to the perspective of the player object corresponding to the user if the player object is under attack, being threatened, or being targeted by another player object (such as another player object different from the player object the user is currently targeting).

Turning now to FIGS. 4-7, exemplary depictions of a dynamic images 400, 500, 600, 700, 800 are provided from various perspectives, in accordance with some embodiments of the present disclosure. Such dynamic images 400, 500, 600, 700, 800 may be provided by a touchscreen of a mobile electronic device. The mobile electronic device can include the computing device 1000 as described below and depicted in FIG. 10. Likewise, the touchscreen can comprise any of the I/O components 1020 described below and depicted in FIG. 10. For example, the touchscreen can particularly comprise embodiments of I/O components 1020 with gesture recognition on screen and touch recognition associated with a display of the computing device 1000.

As illustrated, dynamic images 400, 500, 600, 700, 800 can include movable images or images with objects movable in real-time therein, such as video images, animated images, images comprising movable game pieces, or the like. For example, dynamic images 400, 500, 600, 700, 800 can include visual depictions of at least a portion of a dynamic virtual world for a multiplayer game (e.g., a MOBA game or the like). The visual depictions can comprise fixed graphic objects, such as non-player objects, and movable graphic objects, such as player objects. Visual depictions can include, among other things, animated and/or movable game pieces and/or destinations such as towers, castles, roads, pathways, walls, fences, barricades, trees, mountains, streams, weapons, targets, rewards, or the like. Game pieces, such as player objects 410, 760, 860 can represent locations of various players in the multiplayer game and/or tools (e.g., an ability, a virtual weapon, a spell, or the like) useable by the various players. The visual depictions can display such fixed or movable graphic objects in a perspective view and/or a plan view. However, the system and methods herein can be used within other dynamic images that are not part of a multiplayer game or a single player game without departing from the scope of the technology described herein.

As mentioned, in some embodiments, dynamic images 400, 500, 600, 700, 800 can include a continually-displayed or selectably-displayed mini-map 420, 520, 620, 720, 820. The mini-map 420, 520, 620, 720, 820 or other such graphic depiction may provide a plan view of the dynamic virtual world in its entirety and/or large portions of the dynamic virtual world. Dynamic images 400, 500, 600, 700, 800 may also include continually-displayed or selectably-displayed tools, such as tools 435*a*, 435*b*, 435*c*, 435*d*, 532, 632, 732, 832. Once a tool has been selected, a targeting tool provides a target range of the selected tool within the dynamic image.

Figure 4:
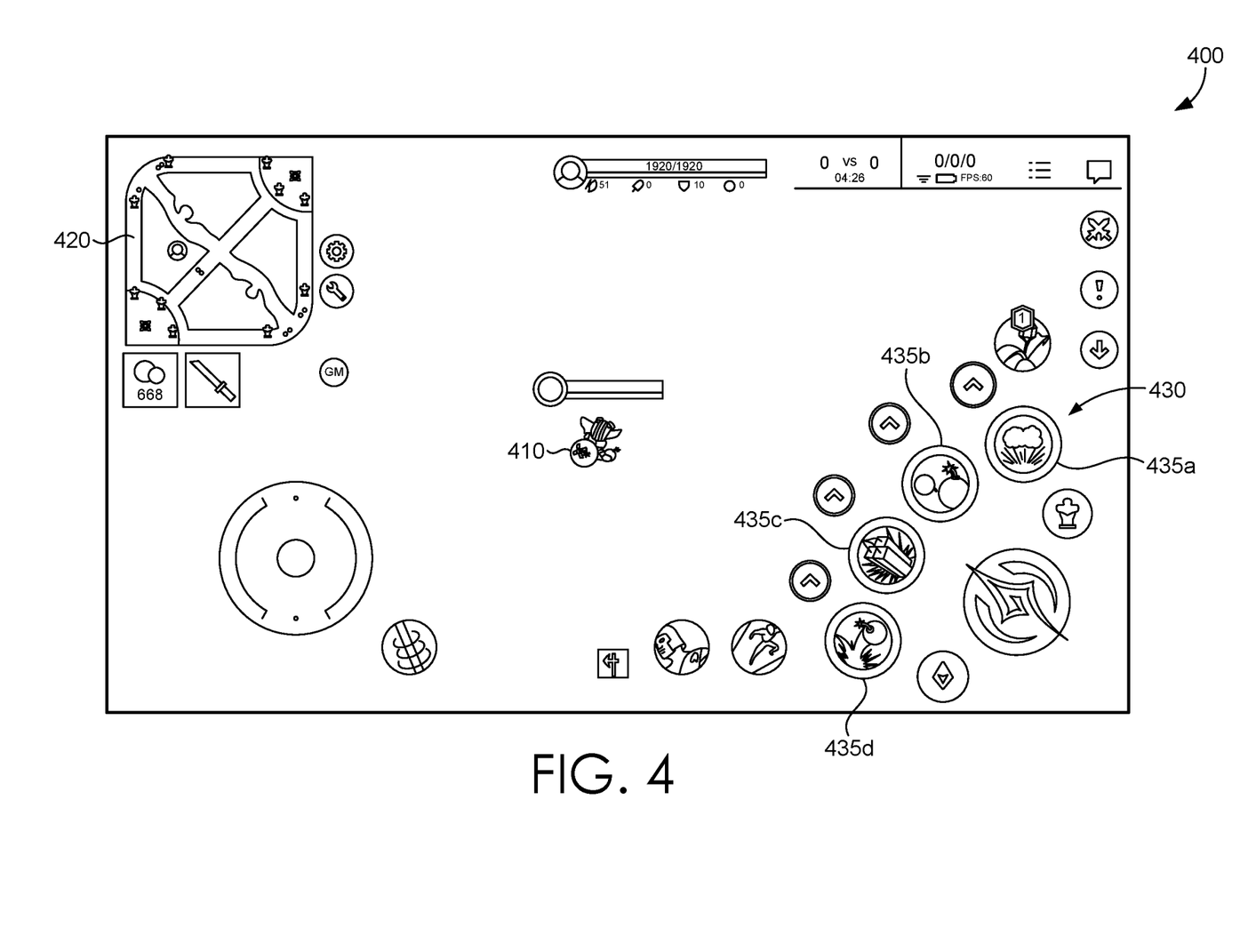
FIG. 4 is an exemplary dynamic image from the perspective of a player object corresponding to the user in accordance with some embodiments of the present disclosure.

Turning now to FIG. 4, the mini-map 420 can be used to present a big-picture view of the entire dynamic virtual world, current conditions within that virtual world, current locations of a player's teammates, as well as other features of the game. As shown in FIG. 4, the dynamic image 400 is provided from the perspective of a player object 410 corresponding to the user. Also shown in FIG. 4 is a tool selection area 430 that enables the user to select from a variety of tools 435*a*, 435*b*, 435*c*, 435*d* that may be employed by the user to target other player objects.

Figure 5:
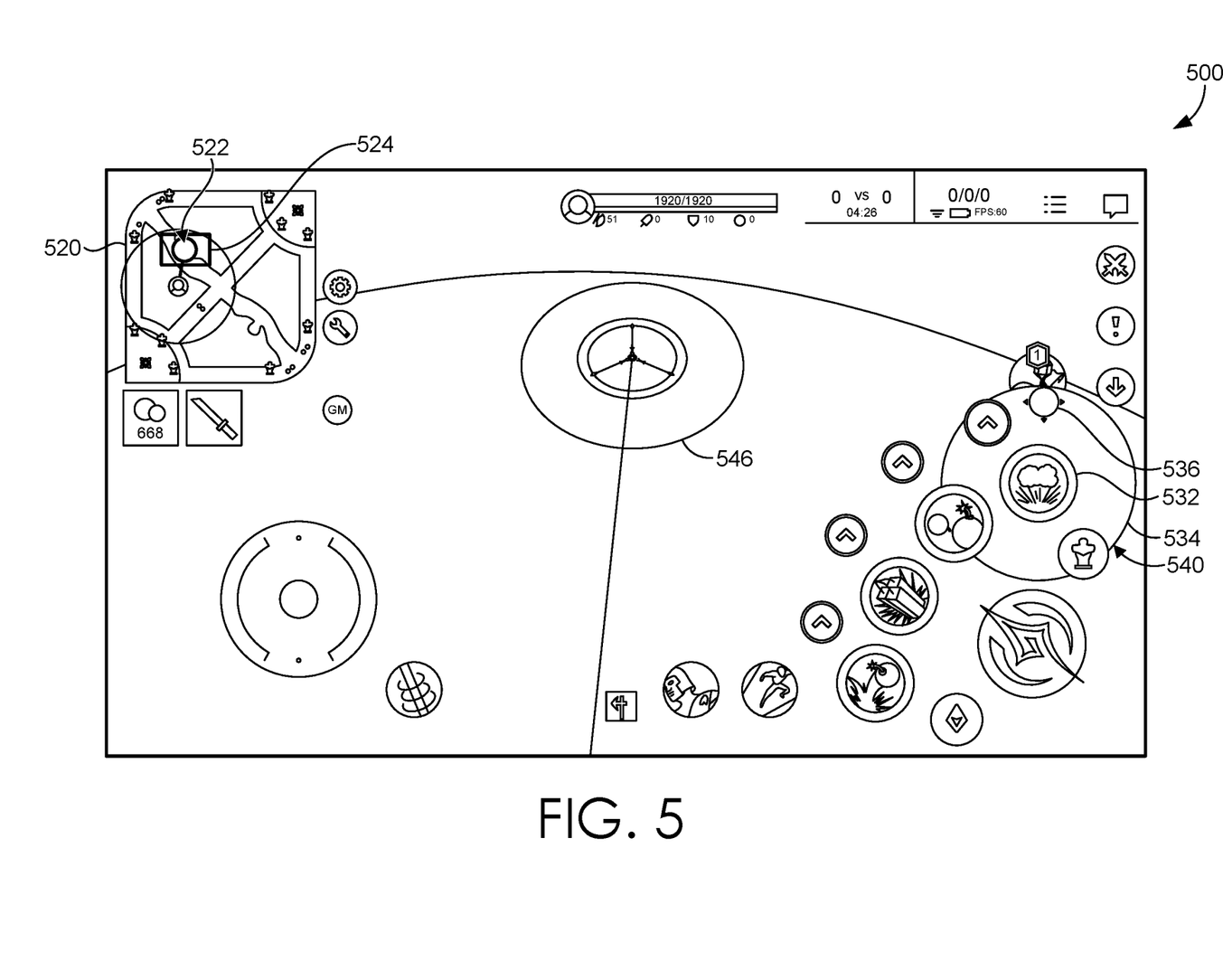
FIGS. 5-8 are exemplary dynamic images from the perspective of a location selected on a mini-map in accordance with some embodiments of the present disclosure.

As depicted in FIG. 5, a tool 532 may be selected by the user by making a touch gesture within the tool selection area of the dynamic image. A touch gesture can include, for instance, tapping the touchscreen with one or more fingers, one or more thumbs, a stylus, or other such selection tool. A second touch gesture may be received at a location 522 within the mini-map 520. In response to the second touch gesture, the dynamic image is automatically adjusted to a perspective representing a selected location 522 of the mini-map 520 corresponding to the received second touch gesture. As shown, an area of the view 524 provided by the adjusted dynamic image 500 is visible within the mini-map 520. A third touch gesture 536 may be received at a targeting tool 534 of the adjusted dynamic image 500. The targeting tool 534 depicts a target range 540 of the selected tool 532 within the adjusted dynamic image 500 and the third touch gesture 536 indicates where the user is targeting within the target range 540. The targeted area 546 is also displayed within the adjusted dynamic image 500.

Figure 6:
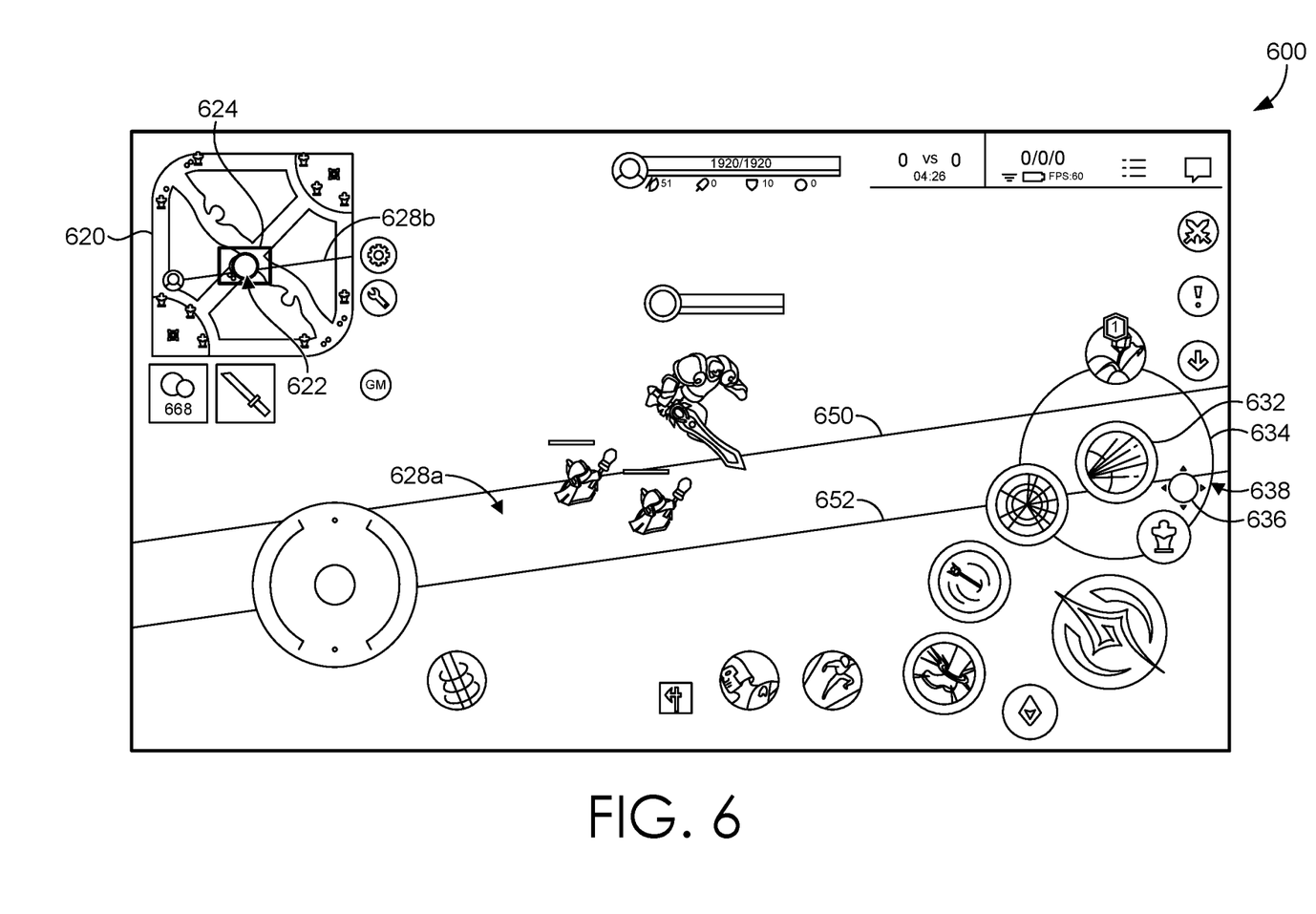

In FIG. 6, a tool 632 may be selected by the user by making a touch gesture within the tool selection area of the dynamic image. A second touch gesture may be received at a location 622 within the mini-map 620. In response to the second touch gesture, the dynamic image is automatically adjusted to a perspective representing the selected location 622 of the mini-map 620 corresponding to the received second touch gesture. As shown, an area of the view 624 provided by the adjusted dynamic image 600 is visible within the mini-map 620. A third touch gesture 636 may be received at a targeting tool 634 of the adjusted dynamic image. The targeting tool 634 depicts a target range 638 of the selected tool 632 within the adjusted dynamic image 600 and the third touch gesture 636 indicates where the user is targeting within the target range 638. Guidelines 650, 652 representing the target path 628*a* of the selected tool 632 is also displayed within the adjusted dynamic image 600. Additionally, a corresponding target path 628*b* may be depicted within the mini-map 620.

Figure 7:
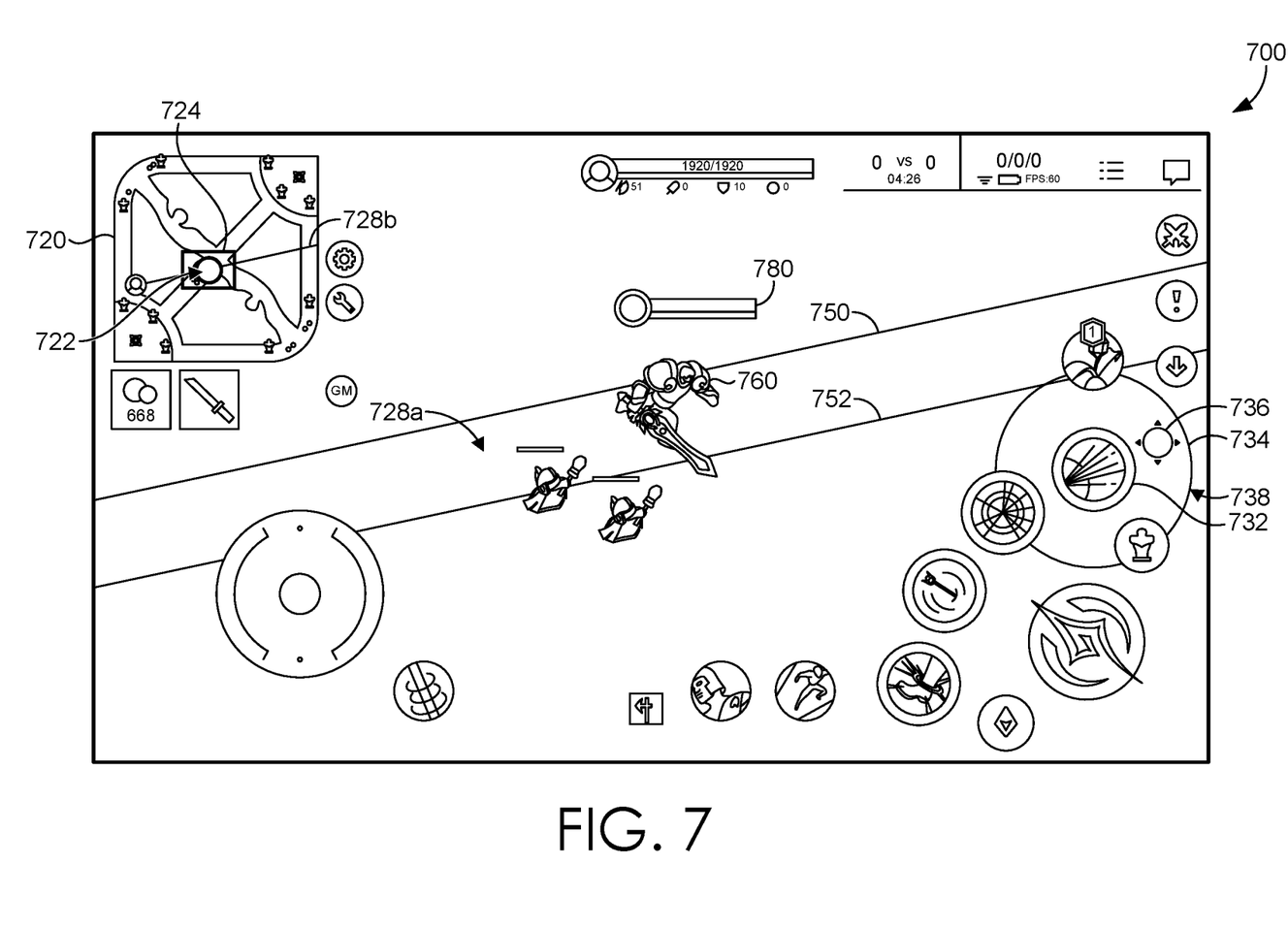

Referring next to FIG. 7, a tool 732 may be selected by the user by making a touch gesture within the tool selection area of the dynamic image. A second touch gesture may be received at a location 722 within the mini-map 720. In response to the second touch gesture, the dynamic image is automatically adjusted to a perspective representing the selected location 722 of the mini-map 720 corresponding to the received second touch gesture. As shown, an area of the view 724 provided by the adjusted dynamic image 700 is visible within the mini-map 720. A third touch gesture 736 may be received at a targeting tool 734 of the adjusted dynamic image 700. The targeting tool 734 depicts a target range 738 of the selected tool 732 within the adjusted dynamic image 700 and the third touch gesture 736 indicates where the user is targeting within the target range 738. Guidelines 750, 752 representing the target path 728*a* of the selected tool 732 is also displayed within the adjusted dynamic image 700. Additionally, a corresponding target path 728*b* may be represented within the mini-map 720. As illustrated by FIG. 7, the user has rotated the target path so that the target object 760 being targeted by the user is now within the guidelines 750, 752. A health status bar 780 may be provided within the adjusted dynamic image 700 to display the health status of the target object 760.

Figure 8:
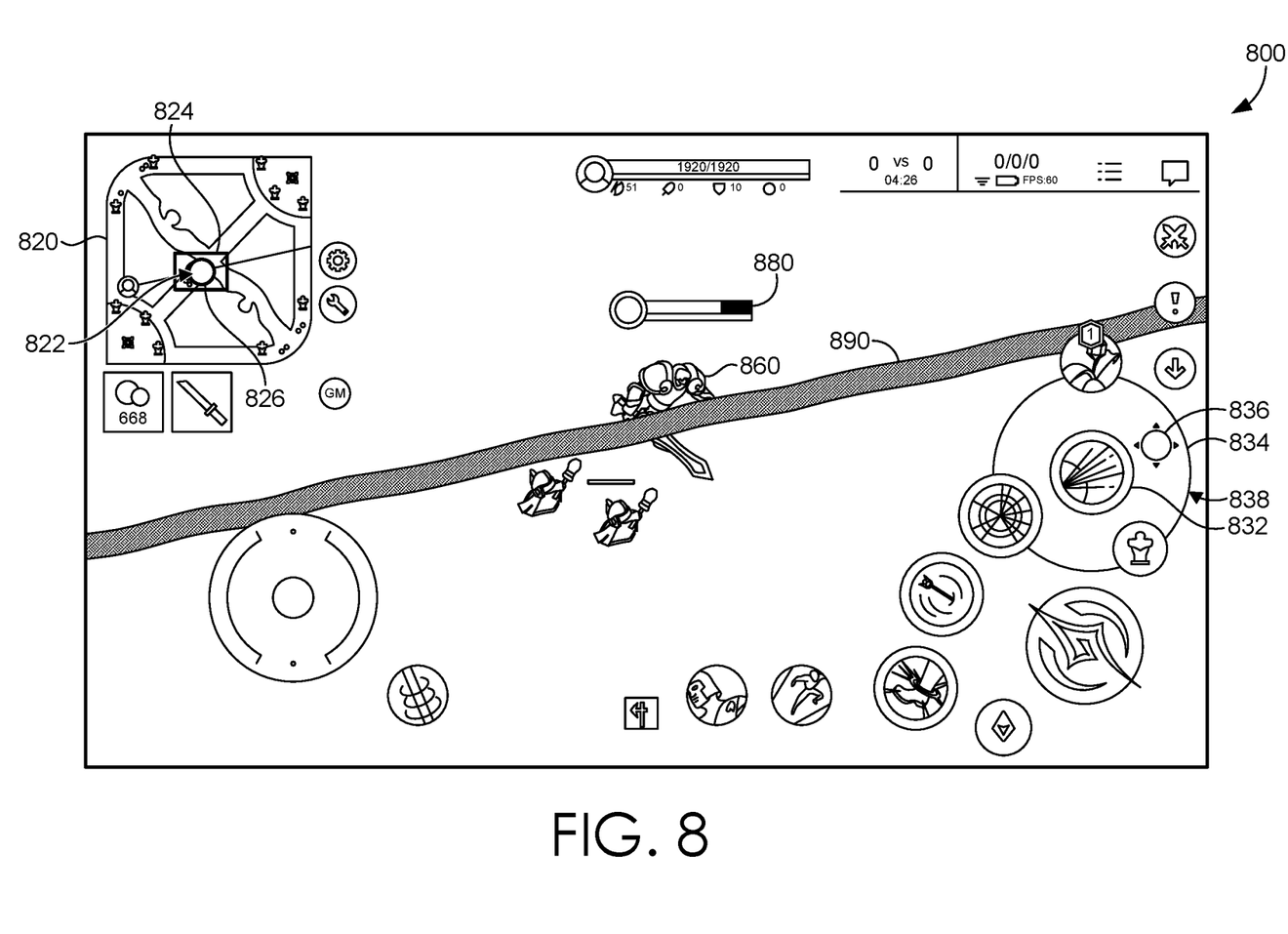

As illustrated in FIG. 8, a tool 832 may be selected by the user by making a touch gesture within the tool selection area of the dynamic image. A second touch gesture may be received at a location 822 within the mini-map 820. In response to the second touch gesture, the dynamic image is automatically adjusted to a perspective representing the selected location 822 of the mini-map 820 corresponding to the received second touch gesture. As shown, an area of the view 824 provided by the adjusted dynamic image 800 is visible within the mini-map 820. A third touch gesture 836 may be received at a targeting tool 834 of the adjusted dynamic image 800. The targeting tool 834 depicts a target range 838 of the selected tool 832 within the adjusted dynamic image 800 and the third touch gesture 836 indicates where the user is targeting within the target range 838. In FIG. 8, the user has executed the third touch gesture 836 and the selected tool 832 is utilized on the target object 860. The third touch gesture 836 may be executed by applying additional pressure to the touchscreen, making an additional tap on the touchscreen, and the like. Accordingly, the selected tool 832 is utilized 890 on the target object 860. The health status bar 880 may be updated within the adjusted dynamic image 800 to display the health status of the target object 860 after the selected tool 832 has been utilized.

Figure 9:
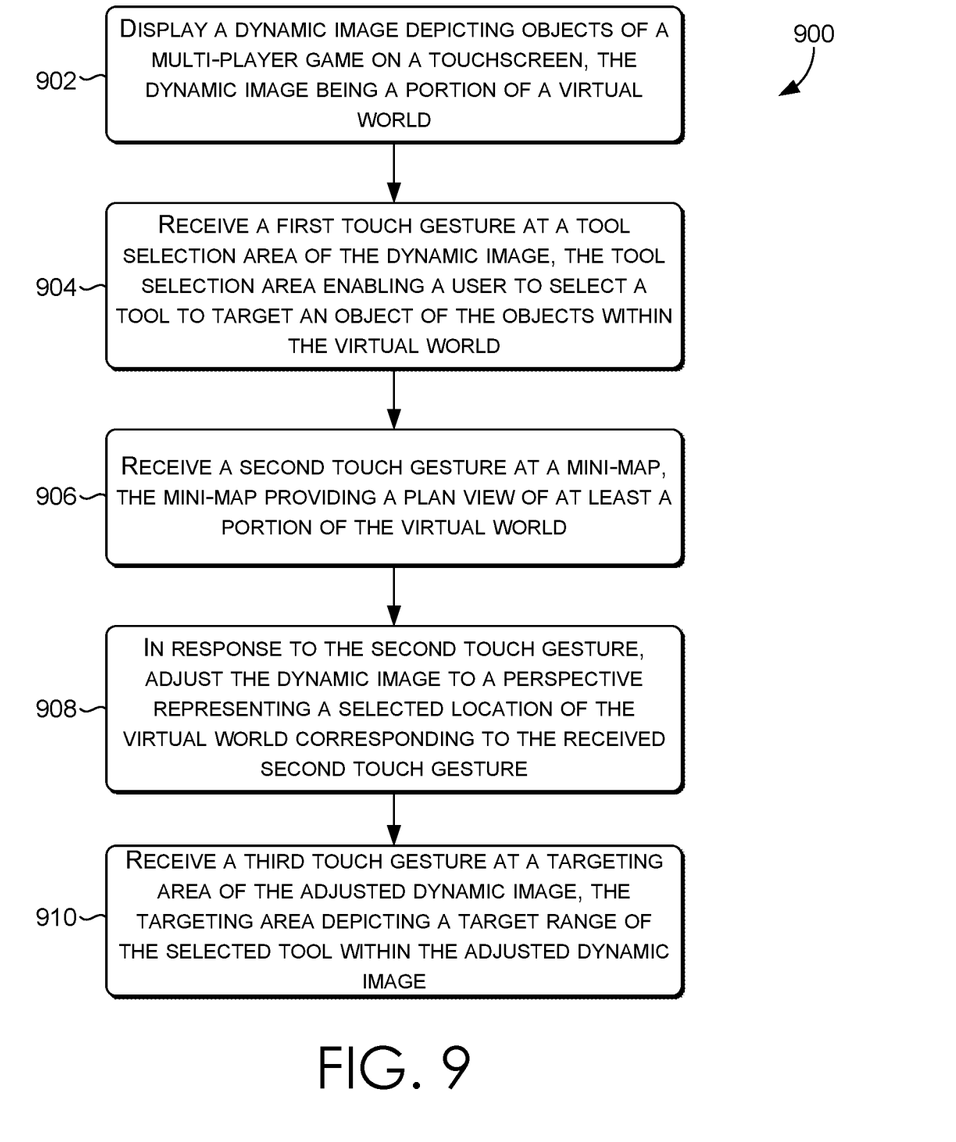
FIG. 9 is a flow diagram depicting a method for offset camera targeting in accordance with some embodiments of the present disclosure.

Now referring to FIG. 9, each block of method, described herein, comprises a computing process that can be performed using any combination of hardware, firmware, and/or software. For instance, various functions can be carried out by a processor executing instructions stored in memory. The method can also be embodied as computer-usable instructions stored on computer storage media. The method 900 can be provided by a standalone application, a service or hosted service (standalone or in combination with another hosted service), or a plug-in to another product, to name a few. For example, as described herein, the method 900 is a virtual tool within other software such as a virtual game. In addition, the method 900 is described, by way of example, with respect to the dynamic image on the touchscreen of FIGS. 4-8. However, these methods can additionally or alternatively be executed by any one system, or any combination of systems, including, but not limited to, those described herein.

In FIG. 9, a flow diagram depicts a method 900 for providing improved targeting of a long-range object, in accordance with some embodiments of the present disclosure. In accordance with various embodiments, the method 900 can be employed to accurately and precisely target a player object in a MOBA game that is outside the current view of the dynamic image displayed to the user. As depicted in block 902, the method 900 can comprise a step of displaying a dynamic image depicting objects of a multi-player game on a touchscreen, the dynamic image being a portion of a virtual world. The virtual world, as described above, can include the mini-map or other dynamic images with fixed and movable graphic objects. For example, the mini-map can be opened by a tap or click onto a map icon, or the mini-map can remain open throughout game play in the multiplayer game manipulated via the touchscreen.

Furthermore, as depicted in block 904, the method 900 can comprise, receiving a first touch gesture at a tool selection area of the dynamic image. The tool selection area enables a user to select a tool to utilize on a target object of the objects within the virtual world. The objects of the multi-player game may comprise player objects and non-player objects. In some embodiments, the dynamic image initially depicts a portion of the virtual world (e.g., objects of the multi-player game) from the perspective of a player object corresponding to the user.

As depicted in block 906, the method 900 can also comprise, receiving a second touch gesture, at a mini-map of the virtual world. As described above, the mini-map provides a plan view of at least a portion of the virtual world. The second touch gesture enables, for example, a user to select an area of the mini-map that is not displayed by the initially provided dynamic image.

The method 900 can also comprise, as depicted at block 908, in response to the second touch gesture, adjusting the dynamic image to a perspective representing a selected location of the virtual world corresponding to the received second touch gesture. In other words, the dynamic image automatically adjusts to show a perspective from the area selected within the mini-map, rather than from the viewpoint of the player object corresponding to the user (i.e., the hero). As can be appreciated, this provides a mini-map-centric view rather than a hero-centric view.

Moreover, a user is able to view a lower level view of the area selected within the mini-map than the high level view provided by the initially provided dynamic image. For example, if the user is attempting to target a player object that was previously outside the display of the dynamic image but is within the area selected within the mini-map, the user may be able to view the player object within the adjusted dynamic image.

As depicted in block 910, the method 900 can also comprise receiving a third touch gesture at a targeting tool of the dynamic image. The targeting tool depicts a target range of the selected tool within the adjusted dynamic image. In some embodiments, the adjusted dynamic image is approximately the size of the target range of the selected tool which enables the user to make more precise targeting movements to target the target object within the adjusted dynamic image than is possible within the initially provided dynamic image. As can be appreciated, the initially provided dynamic image may provide a view that is smaller than the size of the target range (and in some cases, much smaller). In other words, alternatively or additionally, the dynamic image may be adjusted based on the target range of the selected tool. Moreover, the third touch gesture may enable the user to rotate the perspective 360 degrees around the selected location of the dynamic image.

In embodiments, upon execution of the third touch gesture at the targeting tool of the dynamic image, the selected tool is utilized on the target object. For example, if the selected tool is an arrow or a laser, the arrow or laser is shot at the target object. Similarly, if the selected tool is a spell, the spell is cast at the target object. Once the selected tool has been utilized on the target object, the dynamic image may automatically adjust back to the perspective of the player object corresponding to the user. In some embodiments, the dynamic image may not automatically adjust back to the perspective of the player object corresponding to the user until the target object has been eliminated or destroyed.

Figure 10:
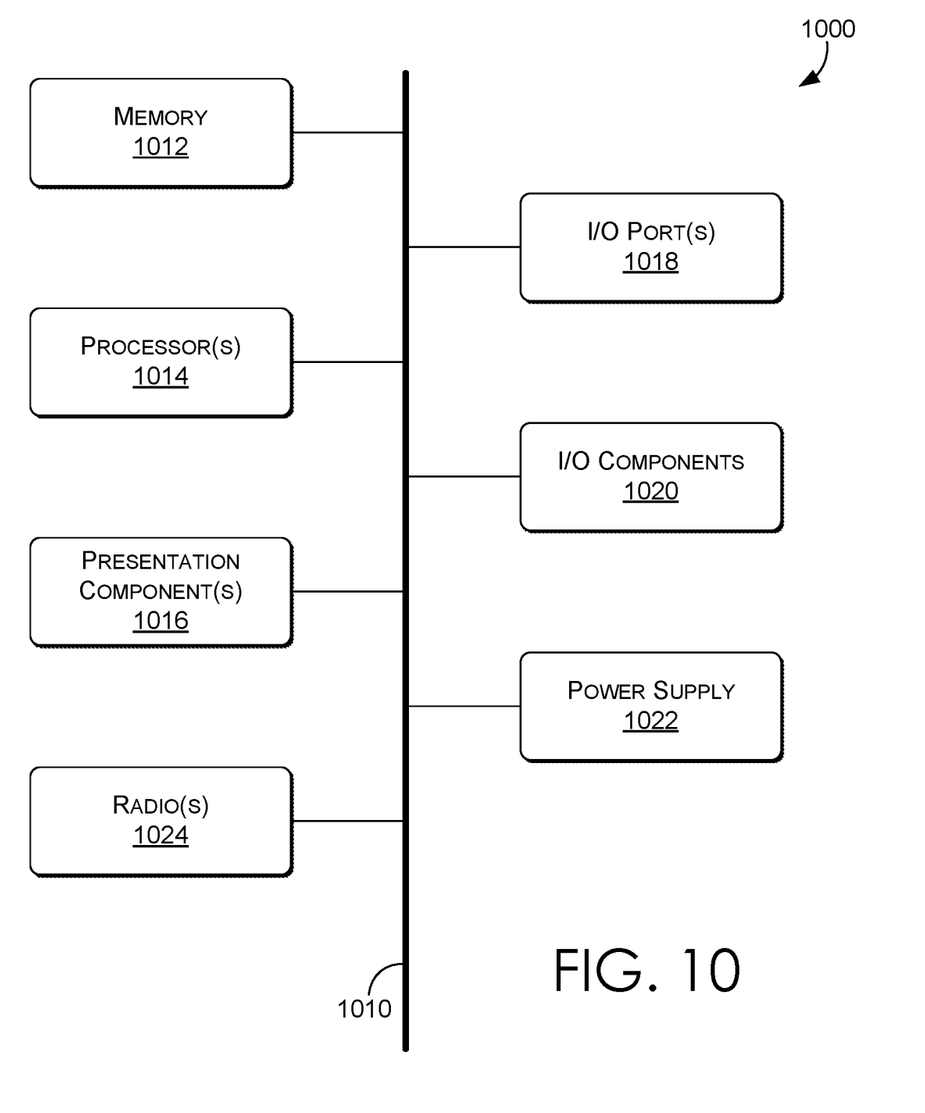
FIG. 10 is a block diagram of an exemplary computing environment suitable for use in implementing some embodiments of the present disclosure.

Having described embodiments of the present disclosure, an exemplary operating environment in which embodiments of the present disclosure can be implemented is described below in order to provide a general context for various aspects of the present disclosure. Referring initially to FIG. 10 in particular, an exemplary operating environment for implementing embodiments of the present disclosure is shown and designated generally as computing device 1000. Computing device 1000 is but one example of a suitable computing environment and is not intended to suggest any limitation as to the scope of use or functionality of the disclosed embodiments. Neither should the computing device 1000 be interpreted as having any dependency or requirement relating to any one or combination of components illustrated.

The embodiments herein can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The described embodiments can be practiced in a variety of system configurations, including hand-held devices, consumer electronics, general-purpose computers, more specialty computing devices, etc. The described embodiments can also be practiced in distributed computing environments where tasks are performed by remote-processing devices that are linked through a communications network.

With reference to FIG. 10, computing device 1000 includes a bus 1010 that directly or indirectly couples the following devices: memory 1012, one or more processors 1014, one or more presentation components 1016, input/output (I/O) ports 1018, input/output (I/O) components 1020, and an illustrative power supply 1022. In some example embodiments, the computing device 1000 can be or can comprise a mobile electronic device such as a smart phone, tablet, touchscreen laptop, or the like. Bus 1010 represents what can be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventor recognizes that such is the nature of the art, and reiterates that the diagram of FIG. 10 is merely illustrative of an exemplary computing device that can be used in connection with one or more embodiments of the present disclosure. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, and removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory can be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 616 present data indications to a user or other device. Exemplary presentation components include a display device, speaker, printing component, vibrating component, etc.

I/O ports 1018 allow computing device 1000 to be logically coupled to other devices including I/O components 1020, some of which can be built in. Illustrative components include a microphone, joystick, game pad, satellite dish, scanner, printer, wireless device, etc. The I/O components 1020 can provide a natural user interface (NUI) that processes air gestures, voice, or other physiological inputs generated by a user. In some instances, inputs can be transmitted to an appropriate network element for further processing. An NUI can implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1000. The computing device 1000 can be equipped with depth cameras, such as stereoscopic camera systems, infrared camera systems, RGB camera systems, touchscreen technology, and combinations of these, for gesture detection and recognition. Additionally, the computing device 1000 can be equipped with accelerometers or gyroscopes that enable detection of motion. The output of the accelerometers or gyroscopes can be provided to the display of the computing device 1000 to render immersive augmented reality or virtual reality.

As can be understood, embodiments of the present disclosure provide for, among other things, systems and methods for precise positioning on a touchscreen. The present disclosure has been described in relation to particular embodiments, which are intended in all respects to be illustrative rather than restrictive. Alternative embodiments will become apparent to those of ordinary skill in the art to which the present disclosure pertains without departing from its scope. From the foregoing, it will be seen that embodiments of the present disclosure are one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. A computer-implemented method for targeting long-range objects in a video game, the method comprising:
providing for display a dynamic image of the video game, the dynamic image depicting a first view of a virtual world and having a tool selection area and a mini-map of the virtual world, wherein the first view corresponds to a first location within the mini-map;
receiving a first gesture that corresponds to selectable tool in the tool selection area;
receiving, based on the first gesture, a second gesture that corresponds to a second location within the mini-map, the second location corresponding to a second view of the virtual world;
in response to the second gesture, adjusting the dynamic image to depict the second view; and
while the adjusted dynamic image is displayed, adjusting within the second view a targeting area of the selectable tool relative to a target outside of the first view based on a third gesture that corresponds to a target range of the selectable tool.

2. The computer-implemented method of claim 1, wherein the dynamic image is provided for display to a touchscreen, and each of the first gesture, the second gesture, and the third gesture is a touch gesture.

3. The computer-implemented method of claim 1, wherein each of the first view and the second view include a corresponding isometric perspective of the virtual world.

4. The computer-implemented method of claim 1, wherein the first location and the second location are different.

5. The computer-implemented method of claim 1, wherein the mini-map depicts a plan view of the virtual world.

6. The computer-implemented method of claim 1, further comprising:
in response to receiving the third gesture, utilizing the selectable tool in accordance with the adjusted targeting area.

7. The computer-implemented method of claim 1, wherein the targeting area is defined by guidelines that represent a target path of the selectable tool.

8. The computer-implemented method of claim 1, wherein the dynamic image is adjusted based on the target range of the selectable tool.

9. The computer-implemented method of claim 1, further comprising:
rotating the adjusted dynamic image around the second location based at least in part on the third gesture.

10. A non-transitory computer storage medium storing computer-useable instructions that, when used by one or more computing devices, cause the one or more computing devices to perform operations comprising:
providing for display a dynamic image of a video game, the dynamic image depicting a first view of a virtual world and having a tool selection area and a mini-map of the virtual world, wherein the first view corresponds to a first location within the mini-map;
receiving a first gesture that corresponds to selectable tool in the tool selection area;
receiving, based on the first gesture, a second gesture that corresponds to a second location within the mini-map, the second location corresponding to a second view of the virtual world;
in response to the second gesture, adjusting the dynamic image to depict the second view; and
while the adjusted dynamic image is displayed, adjusting within the second view a targeting area of the selectable tool relative to a target outside of the first view based on a third gesture that corresponds to a target range of the selectable tool.

11. The medium of claim 10, wherein the dynamic image is provided for display to a touchscreen, and each of the first gesture, the second gesture, and the third gesture is a touch gesture.

12. The medium of claim 10, wherein each of the first view and the second view include a corresponding isometric perspective of the virtual world.

13. The medium of claim 10, wherein the first location and the second location are different.

14. The medium of claim 10, wherein the mini-map depicts a plan view of the virtual world.

15. The medium of claim 10, further comprising:
in response to receiving the third gesture, utilizing the selectable tool in accordance with the adjusted targeting area.

16. The medium of claim 10, wherein the targeting area is defined by guidelines that represent a target path of the selectable tool.

17. The medium of claim 10, wherein the dynamic image is adjusted based on the target range of the selectable tool.

18. The medium of claim 10, further comprising:
rotating the adjusted dynamic image around the second location based at least in part on the third gesture.

19. A computerized system for targeting long-range objects in a video game, comprising:
one or more processors, and
one or more computer storage media storing computer-usable instructions that, when used by the one or more processors, cause the one or more processors to:
provide for display a dynamic image of the video game, the dynamic image depicting a first view of a virtual world and having a tool selection area and a mini-map of the virtual world, wherein the first view corresponds to a first location within the mini-map;
receive a first gesture that corresponds to selectable tool in the tool selection area;
receive, based on the first gesture, a second gesture that corresponds to a second location within the mini-map, the second location corresponding to a second view of the virtual world;
in response to the second gesture, adjust the dynamic image to depict the second view; and
while the adjusted dynamic image is displayed, adjust within the second view a targeting area of the selectable tool relative to a target outside of the first view based on a third gesture that corresponds to a target range of the selectable tool.

20. The system of claim 19, wherein the dynamic image is adjusted based on the target range of the selectable tool.

* * * * *